(12) United States Patent
Lee

(10) Patent No.: US 11,455,211 B2
(45) Date of Patent: Sep. 27, 2022

(54) POWER CONTROL SYSTEM AND POWER CONTROL METHOD

(71) Applicant: Wistron Corporation, New Taipei (TW)

(72) Inventor: Syu-Siang Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 70 days.

(21) Appl. No.: 17/124,510

(22) Filed: Dec. 17, 2020

(65) Prior Publication Data

US 2022/0114056 A1    Apr. 14, 2022

(30) Foreign Application Priority Data

Oct. 13, 2020   (TW) .................................. 109135364

(51) Int. Cl.
*G06F 11/14*   (2006.01)
*G06F 9/4401*  (2018.01)
*G06F 1/30*    (2006.01)

(52) U.S. Cl.
CPC ............ *G06F 11/1441* (2013.01); *G06F 1/30* (2013.01); *G06F 9/4416* (2013.01)

(58) Field of Classification Search
CPC ....... G06F 11/1441; G06F 1/30; G06F 9/4416
See application file for complete search history.

(56) References Cited

U.S. PATENT DOCUMENTS

| 9,746,893  | B1* | 8/2017  | Sizikov ..................... G06F 1/30 |
| 10,678,739 | B1* | 6/2020  | Lee ...................... G06F 13/4081 |
| 10,853,213 | B2* | 12/2020 | Ganesan ................ G06F 11/321 |
| 11,132,041 | B2* | 9/2021  | Knapton ................... G06F 1/28 |
| 11,204,633 | B2* | 12/2021 | Liu ............................ G06F 1/30 |
| 11,226,862 | B1* | 1/2022  | Lambert ............. G06F 11/0757 |
| 2010/0171601 | A1* | 7/2010 | Davidson, II ........ G04G 15/006 |
|            |     |         | 340/309.16 |
| 2015/0333511 | A1* | 11/2015 | Barnette ................... G06F 1/26 |
|            |     |         | 361/95 |
| 2016/0118121 | A1* | 4/2016  | Kelly .................. G06F 13/4282 |
|            |     |         | 710/301 |
| 2017/0220419 | A1* | 8/2017  | Kuo .................... G06F 11/0757 |
| 2018/0165455 | A1* | 6/2018  | Liguori ................. G06F 21/575 |
| 2018/0260280 | A1* | 9/2018  | Traykov .............. G06F 11/0796 |
| 2018/0267811 | A1* | 9/2018  | Matsumoto ............... G06F 1/30 |
| 2018/0314318 | A1* | 11/2018 | Remis ........................ G06F 1/26 |
| 2019/0129801 | A1* | 5/2019  | Lambert ............. G06F 11/1441 |
| 2019/0391948 | A1* | 12/2019 | Lee ..................... G06F 13/4081 |
| 2020/0183790 | A1* | 6/2020  | Brookes ............. G06F 11/3013 |
| 2020/0257461 | A1* | 8/2020  | Sorenson ............ G06F 11/1441 |
| 2021/0132674 | A1* | 5/2021  | Jenne ........................ G06F 1/30 |

* cited by examiner

*Primary Examiner* — Aurel Prifti
(74) *Attorney, Agent, or Firm* — Winston Hsu

(57) ABSTRACT

A power control system for a server is disclosed. The power control system includes a power supply device, configured to provide a main power source and a standby power source; at least a hot swap controller, coupled to the power supply device; at least a peripheral unit, coupled to the power supply device via the hot swap controller; and a motherboard, coupled to the power supply device via the hot swap controller, and includes a logic unit, configured to disable or enable the hot swap controller; and a baseboard management controller, coupled to the logic unit, configured to transmit an AC power cycle signal to the logic unit to disable the hot swap controller, and to transmit a reboot signal to the logic unit to enable the hot swap controller.

12 Claims, 2 Drawing Sheets

POWER CONTROL SYSTEM AND POWER CONTROL METHOD

BACKGROUND OF THE INVENTION

1. Field of the Invention

The present invention relates to a power control system and power control method for a server, and more particularly, to a power control system and power control method for a server capable of reducing labor and time costs.

2. Description of the Prior Art

In order to maintain stable operations of servers in a data center, reliability and stability demands of conventional servers are high. If the server malfunctions, the server system may resume normal operation by rebooting. When, however, a baseboard management controller (BMC), platform controller hub (PCH) or complex programmable logic device (CPLD) of the server malfunctions, or when firmware of the server is carrying out an update and is needed for the rebooting process, a standby power source is used to provide power to the above server elements, i.e. the above elements are all powered-on during the server rebooting. In such a situation, the rebooting system cannot effectively solve the malfunctioning issue when the server elements have completely crashed or the updated firmware cannot be loaded. Instead, a member of management staff is required to reconnect the power supply or power line of the malfunctioned server to completely reboot the server system. A conventional data center has a large number of servers, and the management staff may not be able to handle the malfunctioning server immediately, which increases the burden of maintaining the data center. Therefore, improvements are necessary to the conventional power control system and method.

SUMMARY OF THE INVENTION

The present invention provides a power control system and power control method for a server which can remotely control the power source of the server in order to reduce labor and time costs.

An embodiment of the present invention discloses a power control system for a server, comprising: a power supply device, configured to provide a main power source and a standby power source; at least a hot swap controller, coupled to the power supply device; at least a peripheral unit, coupled to the power supply device via the hot swap controller; and a motherboard, coupled to the power supply device via the hot swap controller, which includes a logic unit, configured to disable or enable the hot swap controller; and a baseboard management controller, coupled to the logic unit, configured to transmit an AC power cycle signal to the logic unit to disable the hot swap controller, and to transmit a reboot signal to the logic unit to enable the hot swap controller.

Another embodiment of the present invention discloses a power control method for a server, comprising: transmitting an AC power cycle signal, by a baseboard management controller, to a logic unit; disabling, by the logic unit, at least a hot swap controller; and enabling the hot swap controller by the logic unit when the baseboard management controller transmits a reboot signal to the logic unit; wherein the hot swap controller is coupled to a power supply device to control a main power source and a standby power source from the power supply device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
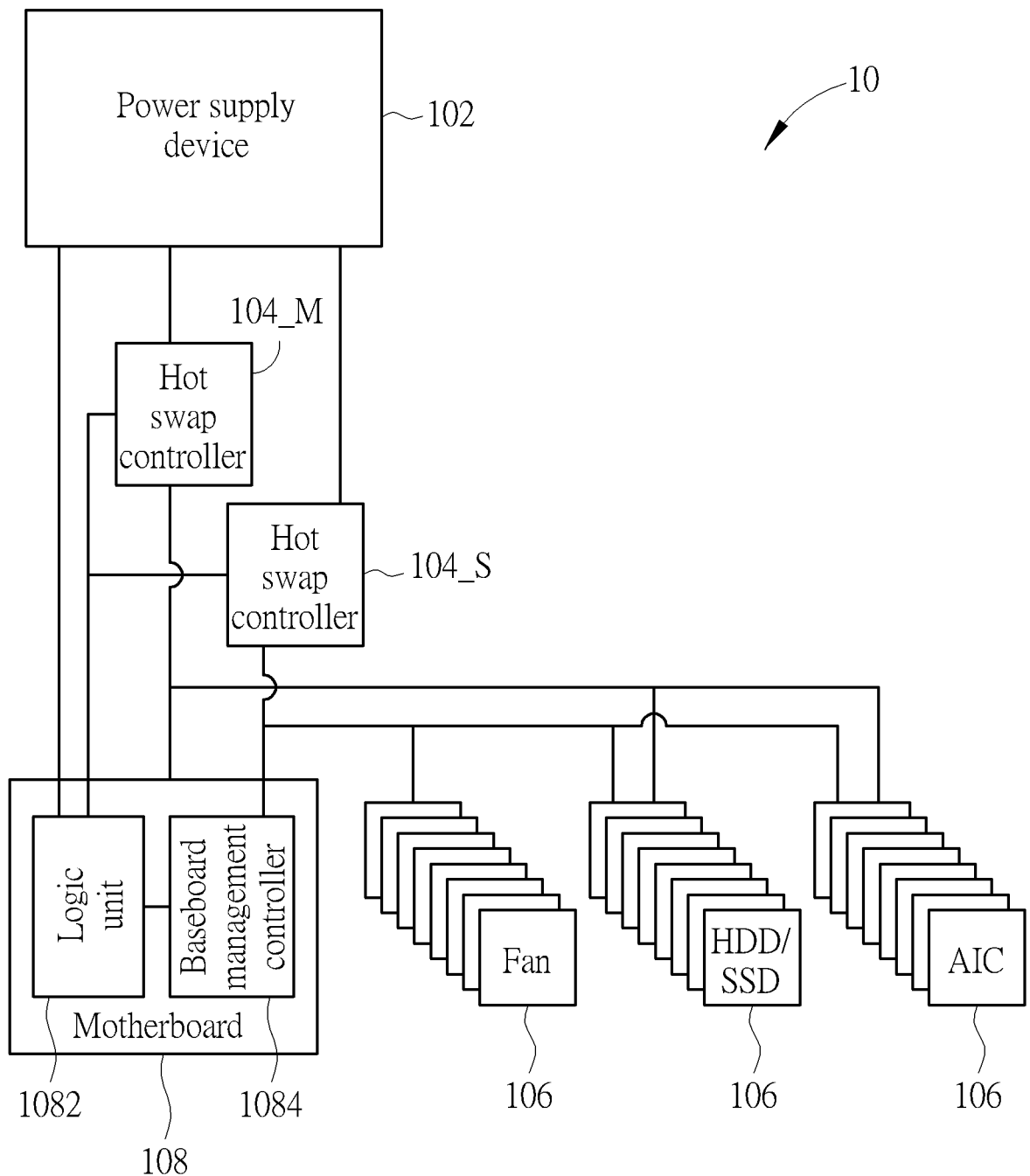
FIG. 1 is a schematic diagram of a power control system according to an embodiment of the present invention.

Refer to FIG. 1, which is a schematic diagram of a power control system 10 according to an embodiment of the present invention. The power control system 10 is utilized for a server (not illustrated in the figures), which includes a power supply device 102, hot swap controllers 104_M, 104_S, at least a peripheral unit 106 and a motherboard 108. The power supply device 102 is configured to receive an alternating current (AC) to provide a main power source and a standby power source of the server. The hot swap controllers 104_M, 104_S are coupled to the power supply device 102, and are configured to protect the server circuit to prevent a sudden change of current from being generated by the power supply device 102. The hot swap controller 104_M is configured to control the supply of the main power source of the power supply device 102 to the motherboard 108. The hot swap controller 104_S is configured to control the supply of the standby power source of the power supply device 102 to the motherboard 108. The peripheral unit 106 is coupled to the power supply device 102 via the hot swap controllers 104_M, 104_S, e.g. the peripheral unit 106 may be a plurality of fans, hard disk drives (HDD), solid-state drives (SSD) or add-in cards (AIC). The motherboard 108 is coupled to the power supply device 102 via the hot swap controllers 104_M, 104_S, wherein the motherboard 108 includes a logic unit 1082 and a baseboard management controller 1084. The logic unit 1082 is coupled to the hot swap controllers 104_M, 104_S, and is configured to enable/disable the hot swap controllers 104_M, 104_S, wherein the logic unit 1082 may be a microcontroller, a field programmable gate array (FPGA) or a complex programmable logic device (CPLD) for directly receiving the standby power source from the power supply device 102. The baseboard management controller 1084 is coupled to the logic unit 1082 and is configured to transmit an AC power cycle signal to the logic unit 1082 to disable the hot swap controllers 104_M, 104_S, and to transmit a reboot signal to the logic unit 1082 to enable the hot swap controllers 104_M, 104_S. Therefore, the power control system 10 according to an embodiment of the present invention may remotely control the power source of the server, such that a user or a member of the technical staff may remotely disable the power source of the server to completely reboot the baseboard management controller 1084, the power source, a platform controller hub (PCH) or a complex programmable logic device (CPLD) of the motherboard 108 powered up by the standby power source, to finish the AC power cycle function.

In comparison to the prior art, the power control system 10 according to an embodiment of the present invention not only enables the user or technical staff to remotely control the power control system of the server to reconnect the power supply or power line of the power control system 10, and also enables the AC power cycle function to finish related testing during a period of the baseboard management controller 1084 setting the AC power cycle.

In detail, since the power source of the logic unit 1082 and the motherboard 108 according to the embodiment of the power control system 10 are independent from each other, the power supply device 102 may directly provide the standby power source to the logic unit 1082. The logic unit 1082 is connected to the baseboard management controller 1084 via an inter-integrated circuit (I2C) bus or a general-purpose input/output (GPIO). The baseboard management controller 1084 is configured to control the logic unit 1082 via the I2C bus. For example, the baseboard management controller 1084 is configured to inform the logic unit 1082 of an execution time of the AC power cycle via the I2C bus (i.e. when the baseboard management controller 1084 transmits the AC power cycle signal to the logic unit 1082) and when to reboot the system of the server. Alternatively, the baseboard management controller 1084 may only inform the logic unit 1082 about the execution time of the AC power cycle, and a reboot timing of the server is determined by a pre-burned firmware of the logic unit 1082.

In an embodiment, the baseboard management controller 1084 informs the logic unit 1082 that a predetermined AC power cycle period is 10 or 30 seconds via the I2C bus; thus, after the logic unit 1082 receives the AC power cycle signal from the baseboard management controller 1084, the hot swap controllers 104_M, 104_S are disabled to completely turn off the main power source and the standby power source until the baseboard management controller 1084 or the firmware of the logic unit 1082 transmits a reboot signal to the logic unit 1082, i.e. the baseboard management controller 1084 requests to reboot the server. The hot swap controllers 104_M, 104_S are enabled by the logic unit 1082, such that the power supply device 102 of the power control system 10 may provide the main power source and the standby power source. The main power source and the standby power source of the power control system 10 according to an embodiment of the present invention are both disabled (i.e. disabling the main power source and those elements with the power source provided by the standby power source of the power supply device 102) when updating the firmware or when the server malfunctions, which could cause damage to the server system.

Notably, the logic unit 1082 may not only control the hot swap controllers 104_M, 104_S but also monitor a status of the baseboard management controller 1084: for example, an operation hour, a device temperature or other operation statuses of the baseboard management controller 1084. The logic unit 1082 of the power control system 10 may provide functions similar to the baseboard management controller 1084 to increase reliability of the system. The baseboard management controller 1084 may edit contents of the logic unit 1082, e.g. edit power management programs for different selections. In addition, a number of hot swap controllers is not limited to the two hot swap controllers 104_M, 104_S mentioned above and can be adjusted according to the power supply device 102 of the power control system 10, which is not limited to the above embodiments.

In another embodiment, the power control system 10 according to an embodiment of the present invention may determine whether to execute the AC power cycle or not according to a watchdog timer of a platform path controller of the logic unit 1082, the baseboard management controller 1084 or the motherboard 108. In addition, as shown in FIG. 1, the peripheral unit 106 may be simultaneously coupled to the hot swap controllers 104_M, 104_S to receive the main power source and the standby power source from the power supply device 102. The peripheral unit 106 may be coupled to the hot swap controller 108_M to receive the main power source from the power supply device 102. For example, the peripheral unit 106 may be a fan coupled to the hot swap controller 108_M to receive the main power source from the power supply device 102. Alternatively, the peripheral unit 106 may be a hard disk drive (HDD), a solid-state drive (SSD) or an add-in card (AIC) coupled to the hot swap controllers 104_M, 104_S to receive the main power source and the standby power source from the power supply device 102.

Figure 2:
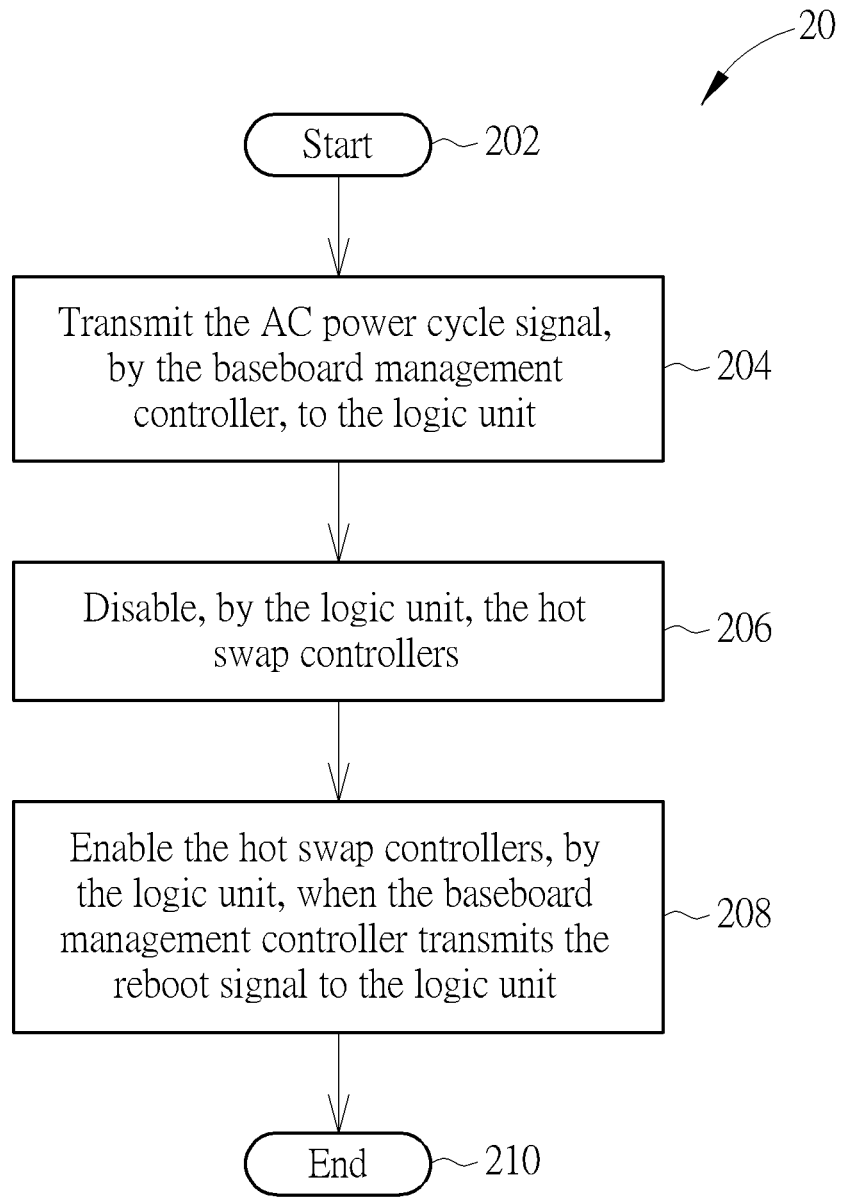
FIG. 2 is a schematic diagram of a power control method according to an embodiment of the present invention.

An operation method of the power control system 10 may be summarized as a power control method 20, as shown in FIG. 2. The power control method 20 includes the following steps:

Step 202: Start.

Step 204: Transmit the AC power cycle signal, by the baseboard management controller 1084, to the logic unit 1082.

Step 206: Disable, by the logic unit 1082, the hot swap controllers 104_M, 104_S.

Step 208: Enable the hot swap controllers 104_M, 104_S, by the logic unit 1082, when the baseboard management controller 1084 transmits the reboot signal to the logic unit 1082.

Step 210: End.

Further details about the operation method of the power control method 20 can be known by referring to the embodiments of the embodiments of the power control system 10 above, and are therefore not narrated here for brevity.

Notably, those skilled in the art may properly design the power control system according to different system requirements. For example, the logic unit for enabling/disabling the hot swap controller is not limited to the microcontroller, FPGA or CPLD. Additionally, the content (i.e. the AC power cycle period and the reboot timing) transmitted from the baseboard management controller to the logic unit, which is carried by the AC power cycle signal, may be modified according to user indications or settings of computer system. The above modifications all belong to the scope of the present invention.

In summary, embodiments of the present invention provide a power control system and a related power control method for a server to remotely control the power source of the server to completely reboot the server, so as to avoid damaging the server and reduce labor and time costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control system, for a server, comprising:
 a power supply device, configured to provide a main power source and a standby power source;
 at least a hot swap controller, coupled to the power supply device;
 at least a peripheral unit, coupled to the power supply device via the hot swap controller; and
 a motherboard, coupled to the power supply device via the hot swap controller, and comprising:
  a logic unit, configured to disable or enable the at least a hot swap controller; and a baseboard management controller, coupled to the logic unit, configured to transmit an AC power cycle signal to the logic unit to disable the hot swap controller, and to transmit a reboot signal to the logic unit to enable the hot swap controller;

wherein the power supply device is utilized for providing the standby power source to the logic unit and the at least a hot swap controller is enabled after the AC power cycle of the motherboard is finished.

2. The power control system of claim 1, wherein the logic unit is a microcontroller, a field programmable gate array (FPGA) or a complex programmable logic device (CPLD).

3. The power control system of claim 1, wherein the hot swap controller is coupled between the power supply device and the motherboard.

4. The power control system of claim 3, wherein a first hot swap controller of the hot swap controller is utilized for controlling the main power source to the motherboard, and a second hot swap controller of the hot swap controller is utilized for controlling the standby power source to the motherboard.

5. The power control system of claim 1, wherein the logic unit and the baseboard management controller is connected by an Inter-Integrated Circuit (I2C) bus.

6. The power control system of claim 1, wherein the baseboard management controller is configured to transmit the reboot signal to the logic unit to enable the hot swap controller after an AC power cycle operation is finished.

7. A power control method, for a server, comprising:
transmitting an AC power cycle signal, by a baseboard management controller, to a logic unit;
disabling, by the logic unit, at least a hot swap controller; and
enabling the hot swap controller, by the logic unit, when the baseboard management controller transmits a reboot signal to the logic unit;
wherein the hot swap controller is coupled to a power supply device to control a main power source and a standby power source from the power supply device;
wherein the power supply device is utilized for providing the standby power source to the logic unit and the at least a hot swap controller is enabled after the AC power cycle of the motherboard is finished.

8. The power control method of claim 7, wherein the logic unit is a microcontroller, a field programmable gate array (FPGA) or a complex programmable logic device (CPLD).

9. The power control method of claim 7, wherein the hot swap controller is coupled between the power supply device and a motherboard.

10. The power control method of claim 9, wherein a first hot swap controller of the hot swap controller is utilized for controlling the main power source to the motherboard, and a second hot swap controller of the hot swap controller is utilized for controlling the standby power source to the motherboard.

11. The power control method of claim 7, wherein the logic unit and the baseboard management controller is connected by an Inter-Integrated Circuit (I2C) bus.

12. The power control method of claim 7, wherein the baseboard management controller is configured to transmit the reboot signal to the logic unit to enable the hot swap controller after an AC power cycle operation is finished.

* * * * *